United States Patent [19]
Craft et al.

[11] Patent Number: 4,564,166
[45] Date of Patent: Jan. 14, 1986

[54] ROTARY TILT BASE FOR VIDEO TERMINAL

[75] Inventors: Charles E. Craft, Croydon, Pa.; Lester Winter, Willingboro; Robert Hawley Pote, Pitman, both of N.J.

[73] Assignee: Delta Data Systems Corporation, Trevose, Pa.

[21] Appl. No.: 459,907

[22] Filed: Jan. 21, 1983

[51] Int. Cl.$^4$ .............................................. F16M 13/00
[52] U.S. Cl. .................................... 248/349; 248/183; 248/288.5
[58] Field of Search ............... 248/346, 183, 228, 181, 248/288.3, 288.5, 371, 349

[56] References Cited

U.S. PATENT DOCUMENTS

| 508,319 | 11/1893 | Ivarson | 248/181 |
|---|---|---|---|
| 2,572,468 | 10/1951 | Gibson | 248/181 |
| 2,893,674 | 7/1959 | Monaco | 248/183 |
| 3,974,994 | 8/1976 | Petterson | 248/181 X |
| 4,068,961 | 1/1978 | Ebner et al. | 248/181 X |
| 4,365,779 | 12/1982 | Bates et al. | 248/371 |
| 4,410,159 | 10/1983 | McVicker et al. | 248/183 |
| 4,473,206 | 9/1984 | Stillinger | 248/371 |

Primary Examiner—J. Franklin Foss
Assistant Examiner—David L. Talbott
Attorney, Agent, or Firm—James A. Drobile

[57] ABSTRACT

A rotary tilt base for a video terminal which enables the operator using the terminal to rotate and tilt respectively, a portion of the base so as to orient the terminal to provide greatest comfort and greatest ease of operation. The base basically includes an upper member and a lower member with the upper member being both rotatably and pivotably mounted to the lower member. In that regard, a convex portion of the upper member slides and rotates within a concave portion of the lower member. The tilting action of the upper member is restricted by guide means which include an elongated linear slot passing completely through the upper member. The guide means insures that the tilting action occurs only in a single, namely, front to back direction. The upper member is secured to the lower member by a generally U-shaped bracket which is positioned to abut or be closely adjacent a portion of the guide means. The bracket serves to position a connecting bolt centrally within the width of the elongated slot, thus permitting the bolt to readily rotate and move longitudinally within the slot to effectuate the rotational and tilting action, respectively, as desired.

7 Claims, 5 Drawing Figures

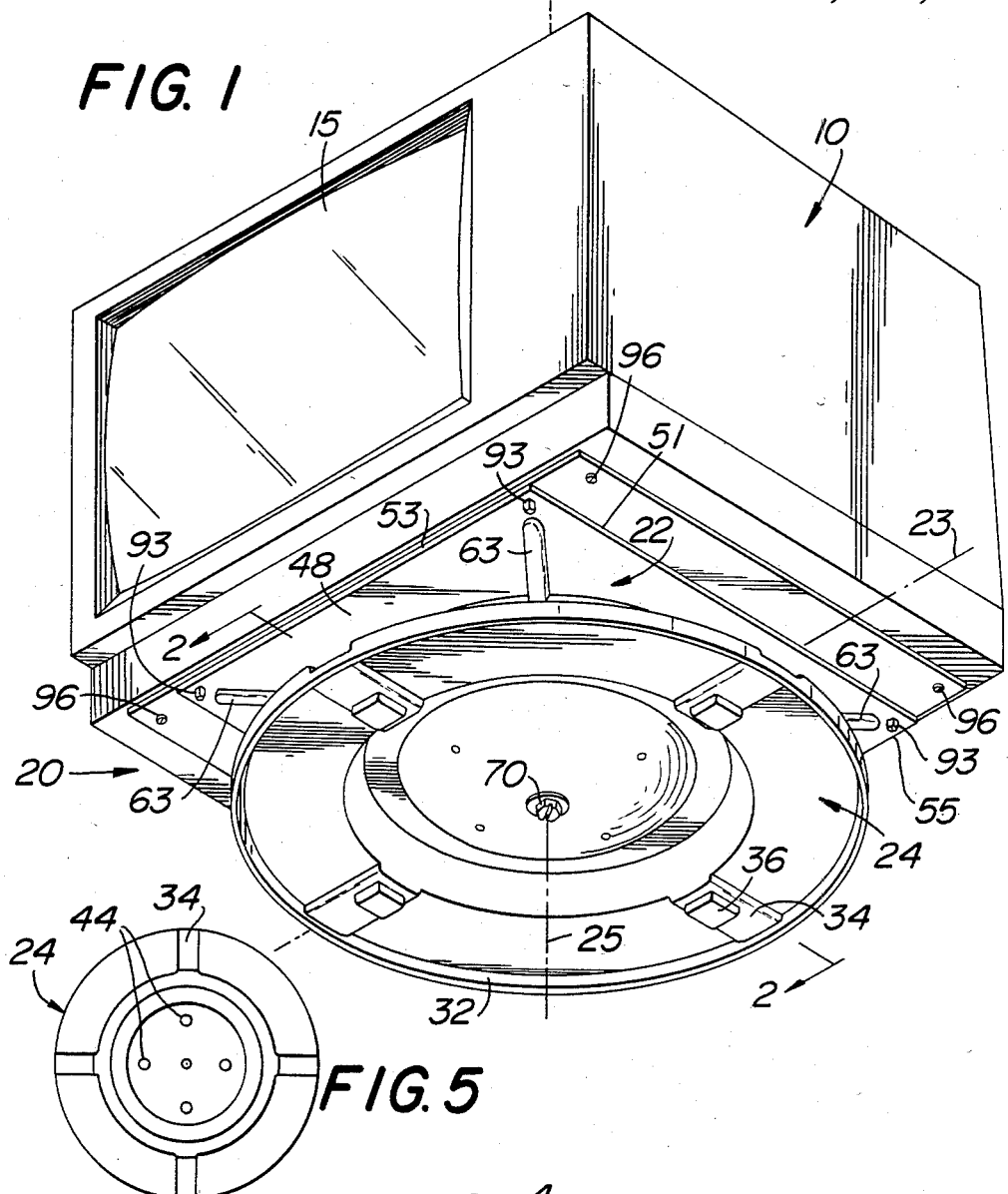
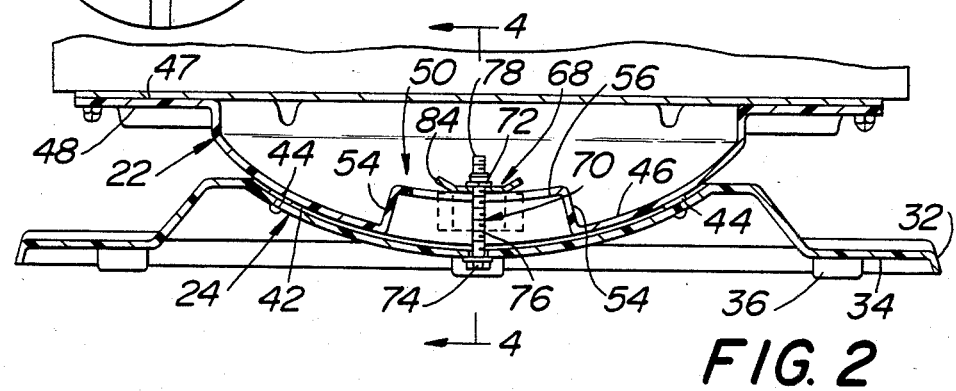

ROTARY TILT BASE FOR VIDEO TERMINAL

BACKGROUND OF THE INVENTION

This invention relates generally to video terminal accessories and more particularly to a supporting base for a video terminal.

Video terminals generally provide means for displaying written or pictorial information on a screen and are used in combination with word processing equipment, microcomputers, computer games, etc. With the sharp increase in the number of microcomputer, word processing and other similar systems in use today, video terminals have become correspondingly more prevalent in our society. To that end, the willing acceptance and efficient use of a computer, a word processing, or some other similar system largely depends upon the system's ability to efficiently adapt to and interact with its human operator.

Since it is not uncommon for the operator or programmer of such a system to spend a considerable amount of time looking at the video terminal's display screen, it is of substantial importance to be able to appropriately position the terminal in order to minimize eye, back and neck strain and fatigue. As can readily be appreciated, by optimally positioning the video terminal, not only is user comfort enhanced but the efficiency of the system as a whole is generally increased as well.

Although there are a number of differently designed and constructed base supports for video terminals disclosed in the prior art, the instant invention provides a video terminal base which is efficient and especially well suited for use in combination with conventional video terminals of various different designs and constructions.

OBJECTS OF THE INVENTION

Accordingly, it is a general object of the instant invention to provide a rotary tilt base for a video terminal which overcomes the disadvantages inherent in prior art bases used in combination with video terminals.

It is another object of the invention to provide a base for a video terminal which is constructed to be able to both rotate and tilt, thus enabling the video terminal to be optimally positioned to maximize the user's comfort.

It is a further object of the invention to provide a supporting base for a video terminal which both rotates and tilts yet still provides secure and stable means of support for the video terminal.

It is still a further object of the invention to provide a rotary tilt base for a video terminal which is durable, simple in construction and readily used in combination with a variety of differently constructed and dimensioned video terminals to provide means of support therefore.

SUMMARY OF THE INVENTION

These and other objects of the instant invention are achieved by providing a rotary tilt base for supporting a video terminal on a supporting surface. The base has a front and a back portion and the terminal includes a display screen which is situated adjacent the front portion of the base when the terminal is resting thereon. The base includes an upper member, a lower member, and connecting means, with one of said members having a concave section and the other of said members having a correspondingly shaped convex section which is slidably situated generally within the concave section. The lower member rests generally adjacent the supporting surface and the upper member is situated generally adjacent and beneath the video terminal. The connecting means includes slotted guide means and fastening means which together serve to connect the lower member to the upper member in a manner permitting pivotable movement of the upper member about a predetermined tilt axis which is parallel to the supporting surface and rotational movement about a rotational axis which is perpendicular to and rotatable about the tilt axis through a predetermined arc. The guide means includes an elongated slot to which one of said members is both rotatably and pivotably connected with the direction of the slot establishing the direction of the tilt axis and the length of the slot generally establishing the predetermined arc.

DESCRIPTION OF THE DRAWING

Other objects and many of the attendant advantages of this invention will be readily appreciated as the same becomes better understood by reference to the following detailed description when considered in connection with the accompanying drawing wherein:

FIG. 1 is a perspective view of a rotary tilt base for a video terminal constructed in accordance with the instant invention, shown supporting a conventional type video terminal thereon;

FIG. 2 is an enlarged sectional view taken along line 2—2 of FIG. 1;

FIG. 5 is a top plan view of a lower member of the rotary tilt base.

DETAILED DESCRIPTION OF THE PREFERRED EMBODIMENT

Figure 3:
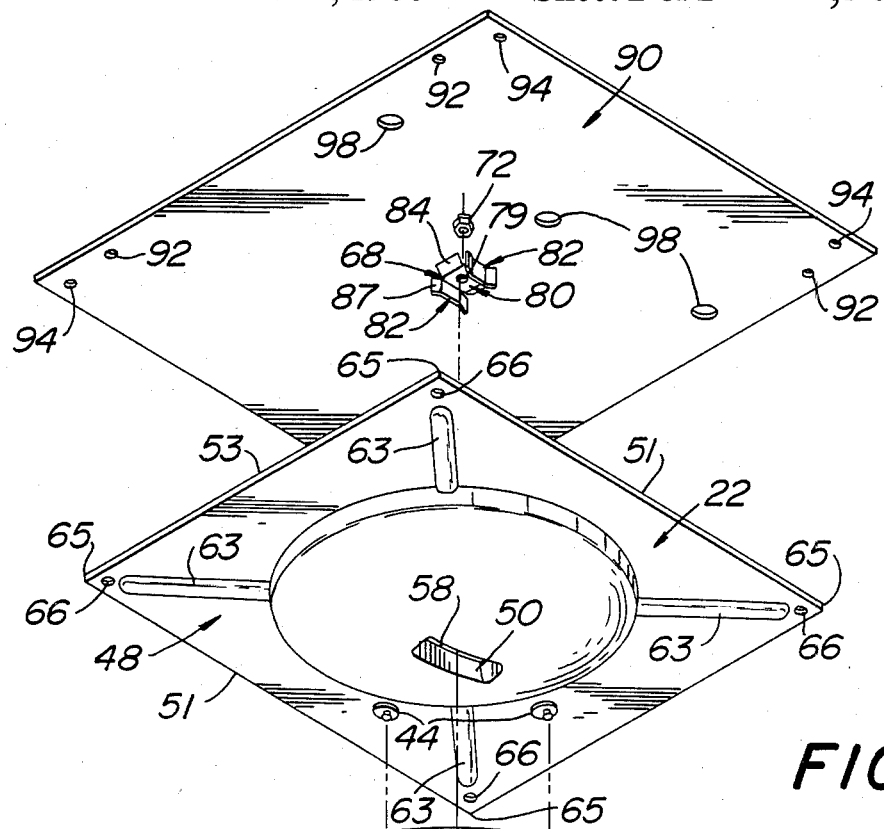
FIG. 3 is an exploded perspective view of the rotary tilt base shown in FIG. 1.

Referring now to the various figures of the drawing wherein like reference characters refer to like parts there is generally shown at 20 in FIG. 1 a rotary tilt base for a video terminal constructed in accordance with the instant invention.

The base 20 is constructed to provide means for supporting a video terminal 10 of the type commonly used with word processing equipment, microcomputers, etc. thereon, to promote ease and comfort of operation for the system's operator. To that end, the base 20 is constructed to be both rotated and tilted by the operator as desired, to orient the screen 15 of the video terminal in the direction providing maximum comfort and greatest ease of operation. Moreover, the base 20 is constructed to accomplish this aim without significantly sacrificing stability and safety with regard to the video terminal which it is supporting.

Figure 4:
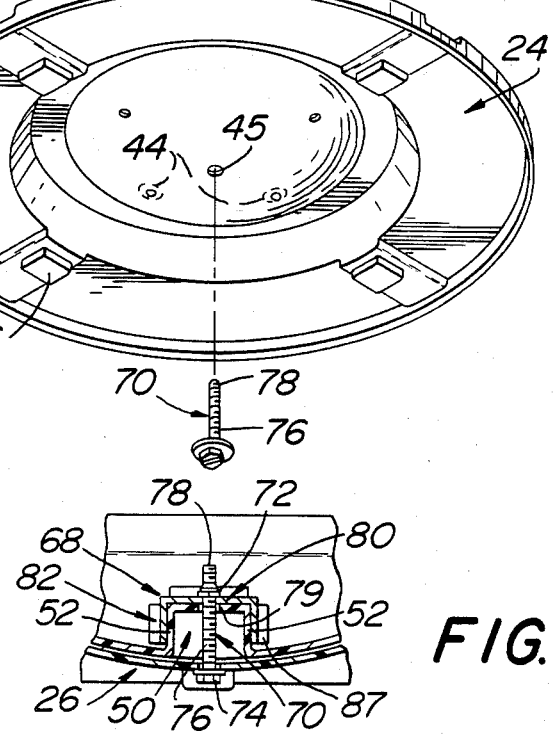
FIG. 4 is a sectional view taken along line 4—4 of FIG. 2.

Referring to FIG. 3, the rotary tilt base 20 basically comprises an upper member 22, a lower member 24, and connecting means 26 (FIG. 4). The lower member 24 which is arranged to rest on a generally horizontal supporting surface such as a desk top (not shown) is connected by the connecting means 26 which serves to support the upper member for rotation and pivoting with respect thereto. Thus, the connecting means 26 is constructed to enable the upper member 22 to pivot about a generally horizontal tilt axis 23 (FIG. 1) through a predetermined arc to be described later. Additionally, the upper member 22 is able to rotate 360 degrees about a rotational axis 25 (FIG. 1) which is perpendicular to and rotatable about the tilt axis 23.

Thus, it should be appreciated that since the upper member 22 is pivotable only about a single axis (e.g., the tilt axis), the upper member 22 is able to tilt in only a single, namely, front to back direction, and is precluded from tilting in all other directions. This feature is important since it insures that when the video terminal 10 is mounted to the base 20, the terminal's display screen 15 is only able to tilt upwardly and downwardly. Obviously, if the base were to be able to tilt in some other direction such action would be undesirable since that would generally require the operator to tilt his or her head in order to read from the screen 15.

As will be appreciated, when the video terminal 10 is mounted on the base 20, its display screen 15 may either be positioned to be generally perpendicular to the desk or table top upon which the base 20 is resting or alternatively, the upper member 22 of the base 20 is readily tilted to cant the screen upwardly or downwardly as desired.

The lower member 24 comprises a generally circular plate having a downwardly extending flange 32 extending from its perimeter. On the bottom surface of the plate there are four downwardly projecting feet 34, each having a rubber pad 36 mounted on its lower surface. The pads 36 and feet 34 serve as support means for the base on a table or desk top. The pads also serve to inhibit the base from sliding along the desk top.

The central portion of the top surface of the member 24 (FIG. 2) is in the form of a spherical concave recess or concavity 42. The concavity 42 is constructed to slidably and rotatably mate with a correspondingly shaped convex, (e.g., generally spherical) portion of the upper member 22 when the base 20 is assembled, as shall be described in detail later.

Furthermore, a plurality of low friction glides in the form of cylindrical buttons or disks 44 are mounted within associated holes in the concavity 42 at evenly spaced points about its nadir. The buttons 44 each include a top surface extending slightly above the surface of concavity 42 to provide a low friction support for the upper member 22, thereby enabling the upper member to readily slide over the bottom member. Although the glides 44 can be formed from a variety of low friction materials, in the preferred embodiment of the invention, the glides are formed of an extrudable, molded Acetal type plastic which is manufactured and sold by E. I. Du Pont de Nemours & Company of Wilmington, Del. under the trademark DELRIN.

As can be seen in FIG. 2 a small hole 45 extends through the center (nadir) of the concavity in the lower member 24. The hole receives the stem of a bolt, to be described later and which makes up a portion of the connecting means 26.

Referring now to FIG. 3 it can be seen that the upper member 22 is in the form of a generally rectangular plate having a top surface 47 (FIG. 2) and a bottom surface 48. The perimeter of the plate is defined by a pair of side edges 51, a front edge 53 and a back edge 55. The central portion of the member 22 is in the form of a domed portion 46. The domed portion 46 is formed by a spherical recess portion in the plate 22. The outer (lower) surface of the portion 46 is configured to mate with the concavity 42 in the bottom portion 24. Thus, the domed portion 46 of the top member is disposed within the concavity 42 in the lower member as shown in FIG. 2.

The top surface of the upper member 22 further includes four reinforcing ribs each in the form of a recess 63, extending in a radial direction from the perimeter of the concavity 46 to a point adjacent a corner 65 of the top surface of the upper member. Furthermore, adjacent the corners of the upper member 22 and thus also adjacent the respective ends of the reinforcing ribs 63 are four respective mounting holes 66 which are used for mounting either the video terminal 10 to the base 20 or alternatively, for securing a mounting plate (to be described later) to the upper member 22.

The center of the recess 46 is in the form of an upwardly projecting slotted guide member 50 (FIG. 2). The guide member 50 establishes or defines the tilt axis and limits the extent to which the upper member 22 is able to tilt about that axis. In that regard, the guide member 50 comprises a pair of elongated generally upwardly extending side walls 52 which are generally planar and a pair of upwardly extending end walls 54. The side walls extend generally parallel to the side edges 51 of the upper member while the end walls extend generally parallel to the front and rear edges 53 and 55, respectively of the upper member. The guide member 50 further comprises a concavely curved top surface 56 having an elongated slot 58 extending therealong and generally parallel to the sidewalls 52. The degree of curvature of the top surface 56 is of approximately the same curvature as that of the recess 46 measured in the longitudinal direction along the guide member.

The connecting means 26 basically comprises a bracket 68, a bolt 70 and a self-locking nut 72. The upper member 22 and the lower member 24 are joined together by a bolt 70, whose stem 76 is inserted through a hole 45 at the nadir of lower member 24 and through the slot 58 in the upper member's guide means 50.

The bracket 68 and the nut 72 combine to rotatably and pivotably secure the free end 78 of the bolt to the top surface (e.g., the slot 58) of the guide member 50, thus joining the upper member 22 to the lower member 24.

As can be seen in FIG. 2, a hole or aperture 79 in the center of the bracket 68 receives the stem 76 of the bolt. The bracket is situated between the top surface of the guide member 50 and the nut 72, with the latter serving to secure the bracket to the guide member. Thus, the bolt 70 and the bracket 68 are able to slide longitudinally along the slot as a single assembly to effectuate the tilting action.

The bracket 68 is a rigid, generally U-shaped member comprising a base section 80, a pair of flanged side legs 82 and a pair of flanged end legs 84. The base section 80 is generally rectangularly shaped with the side legs extending therealong and projecting downward. The end legs are located at the ends of the base section and project upward at an acute angle to the base section.

The bracket is arranged to be disposed over the guide means 50 with each of the bracket's side legs 82 being disposed adjacent a respective sidewall 52 of the guide means. The bracket 68 is arranged to slide with respect to the guide member 50 when the top member is tilted with respect to the bottom member. The side legs serve to guide such sliding action and prevent damage to the slot 56. Thus, the free end 78 of the bolt passes through the hole 45 in the lower member 24, through the slot 58 in the upper member 22 and through the hole 79 in the bracket. A locking nut 72 is mounted on the bolt to hold the assembly together.

With the legs 82 of the bracket abutting or closely adjacent the respective side walls 52 of the guide member 50, the hole 79 in the bracket is centrally positioned relative to the width or lateral dimension of the slot 58 to provide clearance between the bolt stem 76 (which passes through both the hole and the slot) and the side edges of the slot 58. This construction prevents the bolt stem 76 from making physical contact with any portion of the guide member. Thus, friction between the bolt and the guide member, the wear and tear and the inhibition of movement (e.g., sticking) which would otherwise result is avoided.

As should further be appreciated from the foregoing discussion, the upwardly flared legs 84 of the base member and outwardly flared ends 87 of the legs 84 insure that the respective edges of these members do not make physical contact with the guide member 50 so as to cause unnecessary friction which could inhibit the movement of the assembly.

The nut 72 is a conventional device which is both adjustable and self-locking to enable the tension between the bracket 68 and the guide member 50 to readily be set and maintained at a preselected level.

Although a wide variety of different kinds of adjustable self-locking nuts can readily be used in the instant invention, the preferred embodiment of the base 20 uses a nut called a "Penn Fastener" which is manufactured and sold by Penn Engineering Company of Doylestown, Pa.

It should be appreciated that the tension established therebetween is sufficiently great to prevent the upper member from being caused to accidentally pivot from some preset position during normal use of the terminal 10. On the other hand, the tension therebetween is not excessively great so as to prevent a person from readily sliding the bracket along the guide number so as to adjust the angle of tilt when desired.

Should there be any attrition to the various members comprising the base 20 during its useful lifetime resulting in a decrease in tension between the respective members 22 and 24 or should a change in tension therebetween be otherwise desired, the nut 72 is readily rotated in the appropriate direction, e.g., clockwise or counter-clockwise, to restore or set, respectively the desired tension.

Tilting of the upper member 22 is accomplished by manually pushing the member in a direction parallel to the longitudinal dimension of the guide member 50 so as to cause the spherical lower surface portion 46 to slide longitudinally along the top surface of the glides 44 within the concavity 42 of the lower member 24. This is readily accomplished since the curvature of the respective curved portions of the upper member and the lower member are substantially the same, and the glides 44 are of equal height and are evenly spaced so as to generally maintain that curvature. As should readily be appreciated, notwithstanding the rotational movement of the upper member, the bolt 70 which is mounted in the center hole 45 of the lower member serves to restrict the movement of the upper member 22 to the directions parallel to the axis of the slot 58. Since the slot 58 is perpendicular to the front and back edges 53 and 55 respectively of the upper member, the upper member is precluded from pivoting and thus is also precluded from tilting in any other direction, i.e., in a direction other than from front to back. In other words, the upper member 22 is only able to tilt in a radial direction about the tilt axis.

As can further be appreciated by those skilled in the art, the fact that the interacting portions of the upper member 22, the lower member 24 and the top surface 56 of the slotted guide member 50 are all curved to approximately the same angle of curvature in a direction parallel to the slot 58, the pivotable movement between the upper member and the lower member causes not only a horizontal displacment as between the respective upper and lower members but also results in a tilting of the top surface 47 of the upper member. Regarding the latter, when the upper member is pushed in a generally forward direction, the front edge 53 moves in an upward direction while the rear edge 55 moves in a downward direction, thus tilting the top surface 47 of the upper member and the terminal's display screen 15 upwardly.

Conversely, when the upper member is pushed backwards relative to the lower member, the front edge 53 of the upper member moves in a downward direction while the rear edge 55 moves in an upward direction, thus tilting the top surface of the upper member and the terminal's display screen 15 downwardly. It should be appreciated that regardless of how the upper member is positioned, both its front edge 53 and rear edge 55 remain parallel to the supporting surface, e.g., the desk top, upon which the base is resting.

Moreover, it should be appreciated that when the upper member is positioned so that the bolt 70 passes through the center of the longitudinal dimension of the slot 58, the top surface 47 of the upper member is disposed generally parallel to the supporting surface.

It should further be pointed out that the range of angles to which the upper member can be tilted is in part dependent upon the length of the slot 58. In the preferred embodiment of the invention the upper member is able to tilt through a predetermined arc, e.g., approximately 15 degrees in either direction from parallel to the desk top. The bolt 70 is adjacent a respective end of the slot 58.

Rotational movement of the base 20 about axis 25 is achieved by manually turning the upper member 22 about that axis and can readily be accomplished without affecting the angle of tilt of the upper member.

Thus as should readily be appreciated from the foregoing discussion, the degree of tilt and the radial position respectively, of the upper member, are readily established independently of each other as desired.

As to the means by which a video terminal is mounted to the base 20, some of the commercially available video terminals can readily be secured directly to the top surface of the upper member 22 by various conventional means. In that regard, these conventional means include the securement of the video terminal to the upper member by bolting the underside of the video terminal to the mounting holes 66 which are situated adjacent the four corners of the upper member.

Alternatively, other terminals are secured to the base 20 by means of using a mounting plate 90 which is attached to the upper member 22.

The mounting plate 90 is shown in FIGS. 1 and 3 and basically comprises a rectangular, planar plate which is secured to the top surface of the upper member. The mounting plate 90 shown is constructed to be compatible for use with the Model "7XX3" video terminal manufactured and sold by Delta Data Systems Corporation, the assignee of this patent application. To that end, the mounting plate 90 includes four holes 92 which correspond in position to the four holes 66 on the upper member, enabling the plate 90 to be secured thereto by means of the threaded bolts 93. In addition to the holes 92 mentioned above, there are four mounting holes 94 situated generally adjacent the other four respective holes 92. The mounting holes 94 are used for mounting the video terminal to the mounting plate 90 when mounting bolts 96 are inserted through the holes 94 and bolted thereto.

The plate 90 also includes three relatively large holes 98 into which various downwardly projecting pieces of hardware of the video terminal is inserted.

It should further be appreciated that the particular construction of the mounting plate 90 is readily adapted to accommodate the particular constructional features of the housing of other model video terminals not shown, as well.

With regard to the material used in constructing the upper and lower members and the mounting plate 90, the most important characteristics is that it be both of high strength and of high rigidity, yet provide a low coefficient of friction with regard to its interaction with the guide means 44.

Thus, the upper member 22, the lower member 24 and the mounting plate 90 can be constructed from a variety of different materials. However, in the preferred embodiment of the base 20, these respective members are formed of an extrudable molded plastic such as Phenylene, which is sold under the name "Noryl" by General Electric Company of Pittsfield, Mass.

As should readily be appreciated from the foregoing discussion, the base 20 provides rotatable and tiltable means of support for a video terminal, which enables the terminal to be oriented in the direction providing maximum comfort and greatest ease of operation to the person using the terminal. Moreover, the base 20 provides secure means of support for the terminal, is extremely durable and is esthetically pleasing to look at.

Without further elaboration the foregoing will so fully illustrate our invention that others may by applying current or future knowledge reaily adapt the same for use under various conditions of service.

We claim:

1. A base for supporting a video terminal on a supporting surface, with said base having front and back portions and said terminal having a display screen which is situtated adjacent said front portion when said terminal is resting on said base, said base comprising an upper member, a lower member and connecting means, wherein said lower member has a downwardly concave section, said upper member has a correspondingly shaped downwardly convex section which is slidably situtated generally within said concave section of said lower member, said lower member rests generally adjacent said external supporting surface and said upper member is situated generally adjacent and beneath said video terminal, and said connecting means includes slotted guide means and fastening means which together serve to connect said lower member to said upper member in a manner permitting pivotable movement of said upper member about a predetermined tilt axis which is parallel to said supporting surface and unlimited rotational movement about a rotational axis which is perpendicular to and rotatable about said tilt axis through a predetermined arc, wherein said guide means is an upwardly extending projection located on and secured to the top surface of the downwardly convex section of said upper member, said projection having a pair of generally parallel side surfaces and a top surface which includes an elongated slot with the direction of said slot establishing the direction of said tilt axis and the length of said slot generally establishing said predetermined arc, and wherein said fastening means includes a fastening member and a generally U-shaped bracket having an apertured base section and a pair of downwardly extending legs, said base section being disposed over and adjacent said top surface of said guide means and said legs being located adjacent respective side surfaces of said guide means, with said bracket serving to insure that said fastening member is centered within said slot irrespective of its longitudinal position within said slot, the angle of tilt of said base being established by longitudinally positioning a portion of said fastening means within said slot.

2. The base of claim 1, wherein said fastening means further comprises a nut and a bolt and wherein a portion of said bolt passes through a hole in said lower member, through said slot, through the aperture in said bracket and is secured thereat by said nut.

3. The base of claim 2, wherein said nut is both adjustable and self-locking.

4. The base of claim 1, wherein said base section and said legs of said bracket are each constructed as generally planar surfaces having flanged ends which flare away from said guide means so as not to touch and frictionally interfere with the movement of said bracket therealong.

5. The base of claim 1, further comprising a generally planar mounting plate which is connected to the top of said upper member to facilitate the mounting of said terminal to said base.

6. The base of claim 1, further comprising a plurality of low friction buttons which are secured to one of said members to enable the other of said members to readily slide thereupon.

7. The base of claim 6, wherein said buttons are secured to said lower member.

* * * * *